United States Patent
Umezawa et al.

(10) Patent No.: US 6,338,441 B1
(45) Date of Patent: Jan. 15, 2002

(54) AUTOMATIC PAINTING DEVICE

(75) Inventors: Norio Umezawa, Yokohama; Toshio Hosoda, Fujieda; Osamu Yoshida; Toshiaki Nakano, both of Tokyo, all of (JP)

(73) Assignee: ABB K. K., Tokyo (JP)

( * ) Notice: Subject to any disclaimer, the term of this patent is extended or adjusted under 35 U.S.C. 154(b) by 19 days.

(21) Appl. No.: 09/601,341

(22) PCT Filed: Dec. 9, 1999

(86) PCT No.: PCT/JP99/06919

§ 371 Date: Aug. 4, 2000

§ 102(e) Date: Aug. 17, 2000

(87) PCT Pub. No.: WO00/37181

PCT Pub. Date: Jun. 29, 2000

(30) Foreign Application Priority Data

Dec. 18, 1998 (JP) .......................................... 10-360959

(51) Int. Cl.[7] .............................. B67D 5/08; B67D 5/38
(52) U.S. Cl. ............................. 239/71; 239/71; 239/73; 239/223; 239/104; 239/112; 239/322; 239/329; 239/600; 901/43
(58) Field of Search ................................. 239/104, 106, 239/112, 223, 224, 320, 323, 329, 700, 703, 708, 600, DIG. 14, 71, 73, 74; 222/148, 325, 326, 327, 386, 389; 118/729, 730; 901/43

(56) References Cited

U.S. PATENT DOCUMENTS 4,813,603 A * 3/1989 Takeuchi et al. ....... 239/223 X
5,310,120 A * 5/1994 Ehinger et al. ......... 239/322 X
6,164,561 A * 12/2000 Yoshida et al. ............. 239/223
6,179,217 B1 * 1/2001 Yoshida et al. ......... 239/223 X
6,234,405 B1 * 5/2001 Yoshida et al. ......... 239/223 X

FOREIGN PATENT DOCUMENTS

JP 04-83549 * 3/1992

* cited by examiner

Primary Examiner—Robin O. Evans
(74) Attorney, Agent, or Firm—Oblon, Spivak, McClelland, Maier & Neustadt, P.C.

(57) ABSTRACT

An automatic coating apparatus which is arranged to guarantee higher operational reliability, particularly to preclude coating defects as caused by malfunctioning of a cartridge gripper (56) or by the use of an non-replenished or deficiently replenished paint cartridge. A cartridge gripper assembly (55) is constituted by a gripper member (56) with gripper claws for gripping a paint cartridge (25), a grip detector switch (67) which is adapted to detect whether or not the paint cartridge (25) is securely gripped by the gripper. (56), and a replenishment level detector switch (68) which is adapted to detect whether or not the paint cartridge (25) is replenished with paint to a predetermined extent. Therefore, as the paint cartridge (25) is gripped by the cartridge gripper (56), the grip condition on the paint cartridge (25) can be monitor by the grip detector switch (67). At the same time, a replenished paint level within the cartridge (25) can be monitored from outside by the replenishment level detector switch (68).

7 Claims, 10 Drawing Sheets

AUTOMATIC PAINTING DEVICE

TECHNICAL FIELD

This invention relates to an automatic coating apparatus which is equipped with a cartridge gripper for replaceably and selectively mounting and dismantling paint cartridges of various colors on the coating apparatus.

BACKGROUND ART

Generally, for coating object such as vehicle bodies, for example, rotary atomizing head type coating apparatus have been in wide use. Lately, coating apparatus of this sort are increasingly required to meet demands for reductions of the amounts of paint and solvent to be discarded at the time of color changes and for capability of coping with a large number of paint colors.

There has been known a rotary atomizing head type coating apparatus which is so arranged as to reduce the amounts of discarding paint and solvent and which can cope with an increased number of paint colors, for example, from Japanese Laid-Open Patent Publication No. H8-229446. This rotary atomizing head type coating apparatus uses paint cartridges which are filled with different paint colors and adapted to be selectively and replaceably mounted on the coating apparatus in the course of a coating operation on vehicle bodies.

Regarding coating operations on vehicle bodies or the like, there has also been known automatic coating apparatus (e.g. from International Gazette WO97/34707) which is arranged to perform a coating operation automatically according to programmed procedures. This automatic coating apparatus is comprised of a working mechanism such as a coating robot which is provided in a coating area, a coating machine which is mounted on the working mechanism and provided with a rotary atomizing head adapted to be put in high speed rotation by an air motor for atomizing paint into minute particles, a number of paint cartridges which are filled with paint of different colors and adapted to be replaceably mounted on the coating machine, and a cartridge gripper which is arranged to pick up a replenished paint cartridge and mount it on the coating apparatus in place of an empty paint cartridge.

In the case of the prior art automatic coating apparatus which is arranged as described above, paint is supplied from the cartridge to the rotary atomizing head, which is put in high speed rotation by the air motor, and thereby sprayed toward a coating object. At this time, the working mechanism is put in operation to move the coating apparatus along contours of coating surfaces of a coating object.

When changing the paint color, the working mechanism is moved to bring the paint cartridge on the coating apparatus to a position in the proximity of the cartridge gripper. Then, the cartridge gripper is operated to remove the consumed or empty paint cartridge from the coating apparatus and to mount thereon a fresh paint cartridge which is filled with a different paint color.

The above-mentioned prior art automatic coating apparatus is arranged to mount and dismantle paint cartridges on and from the coating apparatus by gripping actions of the cartridge gripper. However, generally cartridge grippers of this sort could become inoperative due to troubles of gripping parts or components, thereby presumably failing to grip a paint cartridge in a satisfactory manner. In the case of the prior art automatic coating apparatus, a coating operation proceeds automatically according to a preset coating program irrespective of a failure in dismantling a used paint cartridge from the coating apparatus or in mounting a fresh paint cartridge on the coating apparatus. Therefore, in such a case, it is difficult to form coatings of appropriate quality on coating object, not to mention deteriorations in yield and productivity.

Further, the automatic coating apparatus is arranged to replace a used empty paint cartridge on the coating apparatus by a fresh paint cartridge which is replenished with paint. However, in the event of a trouble occurring to a cartridge replenishing apparatus, one may face a situation where a replacing cartridge is not replenished with paint at all. Since the amount of paint within a replenished cartridge is not visible from outside, it is only after a coating operation has actually started that a judgement can be made as to whether or not a freshly mounted paint cartridge is replenished with paint to a sufficient degree.

For this reason, it is likely for the automatic coating apparatus as in the above-mentioned prior art to experience difficult situations in which paint in a cartridge becomes prematurely deficient in the course of a coating operation, and as a result often suffer from coating defects.

DISCLOSURE OF THE INVENTION

In an attempt to solve the above-mentioned problems of the prior art, the present invention contemplates to provide an automatic coating apparatus which can attain higher yield and productivity in coating by precluding malfunctioning of a cartridge gripper or its components and at the same time detecting a non-replenished or deficiently replenished paint cartridge beforehand.

More particularly, this invention concerns an automatic coating apparatus of the type which is basically comprised of a working mechanism located in a coating work area, a coating apparatus mounted on said working mechanism and having a rotary atomizing head to be put in high speed rotation by an air motor for atomizing paint into minute particles, a number of paint cartridges of different colors each adapted to be replaceably and selectively mounted on the coating apparatus, and a cartridge gripper unit adapted to grip a replenished paint cartridge to replace a used empty paint cartridge on the coating apparatus.

In order to solve the above-mentioned problems, according to the present invention, the cartridge gripper unit is arranged to comprise a gripper member adapted to grip and pick up one of the paint cartridges, a grip detection means adapted to detect whether or not the paint cartridge is securely gripped by the gripper member, and a replenishment level detection means adapted to detect whether or not the paint cartridge is replenished with paint to a predetermined degree.

With the arrangements just described, when the paint cartridge is gripped by the gripper member, the grip condition of the gripper member which holds the paint cartridge is checked out by the grip detection means to detect beforehand incomplete grip conditions which might have resulted from malfunctioning of the gripper member. At the same time, a replenished paint level in the gripped paint cartridge is checked out by the replenishment level detection means to sort out a non-replenished or deficiently replenished paint cartridge if any.

In this instance, the gripper member to be used in the present invention can be comprised of a reciprocating actuator, and a plural number of gripper claws connected to the reciprocating actuator and thereby moved to grip or release the paint cartridge, and the grip detection means is constituted by a switch adapted to detect displacement of the reciprocating actuator.

With the arrangements just described, the gripper member is arranged to grip the paint cartridge between gripper claws which are moved toward and away from each other by reciprocating movements of the reciprocating actuator. At the time of gripping the paint cartridge, location of the gripper claws in a predetermined gripping position is detected by the grip detector switch from a displacement distance of the reciprocating actuator.

Further, the gripper member to be used in the present invention is preferably comprised of a reciprocating actuator, and a plural number of gripper claws connected to the reciprocating actuator and thereby closed or opened to grip or release the paint cartridge, and the grip detection means is constituted by a grip position detector switch adapted to detect displacement of the reciprocating actuator to a predetermined cartridge gripping position, and a release position detector switch adapted to detect displacement of the reciprocating actuator to a predetermined gripper claw opening position.

With the arrangements just described, since under normal operation conditions the displacement (reciprocating movement) of the reciprocating actuator comes to a stop at a predetermined position at the time of gripping a paint cartridge between the gripper claws, the grip position detector switch can detect the grip condition from the displacement of the reciprocating actuator to the predetermined gripping position. On the other hand, since the displacement (reciprocating movement) of the reciprocating actuator also comes to a stop at a predetermined gripper claw opening position, the open position detector switch can detect an open state of the gripper claws from the displacement of the reciprocating actuator to the predetermined claw opening position. The gripper claws are abutted against each other in case the displacement of the reciprocating actuator is detected by neither the grip position detector switch nor the open position detection switch.

On the other hand, the paint cartridge to be used in the present invention can be comprised of a container, a feed tube extended out from a fore end of the container, and a movable partition wall provided internally of the container to divide same into a paint reservoir chamber in communication with the feed tube and an extruding liquid chamber connected to a paint extruding liquid supply, said replenishment level detection means is constituted by a detector switch adapted to detect displacement of said movable partition wall when said container is replenished with paint.

With the arrangements just described, upon replenishing paint into the paint reservoir chamber within the container, the movable partition wall is displaced according to the amount of replenished paint. Consequently, when a replenished paint cartridge is gripped between the gripper claws, the replenishment level detector switch can detect the replenished paint level from a displacement distance of the movable partition wall.

Further, the paint cartridge to be used in the present invention is preferably comprised of a container formed of a non-magnetic material and closed on the side of a base end thereof, a feed tube extended out from a fore end of the container, a movable partition wall provided internally of the container to divide same into a paint reservoir chamber in communication with the feed tube and an extruding liquid chamber connected to a paint extruding liquid supply, a core member of a magnetic material provided at the base end of the container, and a permanent magnet provided on the movable partition wall in a confronting position relative to the core member, and the replenishment level detector means is constituted by a magneto-sensitive switch adapted to detect the permanent magnet when moved to the proximity of the core member.

With the arrangements just described, upon replenishing paint into the paint reservoir chamber within the container, the movable partition wall is pushed toward the base end of the container in proportion to the amount of replenished paint, and the permanent magnet on the movable partition wall is brought to the proximity of the core member at the end of a replenishing operation. Therefore, when a container of a replenished cartridge is gripped between the gripper claws, the replenishment level detector switch can detect the permanent magnet through the core member if the paint cartridge is replenished to a predetermined level. On the other hand, in case the container is not replenished with a predetermined amount of paint, the permanent magnet is not detected by the replenishment level detector switch in its proximity.

According to the present invention, the movable partition wall may be constituted by a piston which is slidably fitted in the container for axial sliding movements therein.

Alternatively, according to the present invention, the movable partition wall may be constituted by a bellows tube which is contractibly expansible in the container.

BEST MODE FOR CARRYING OUT THE INVENTION

Figure 1:
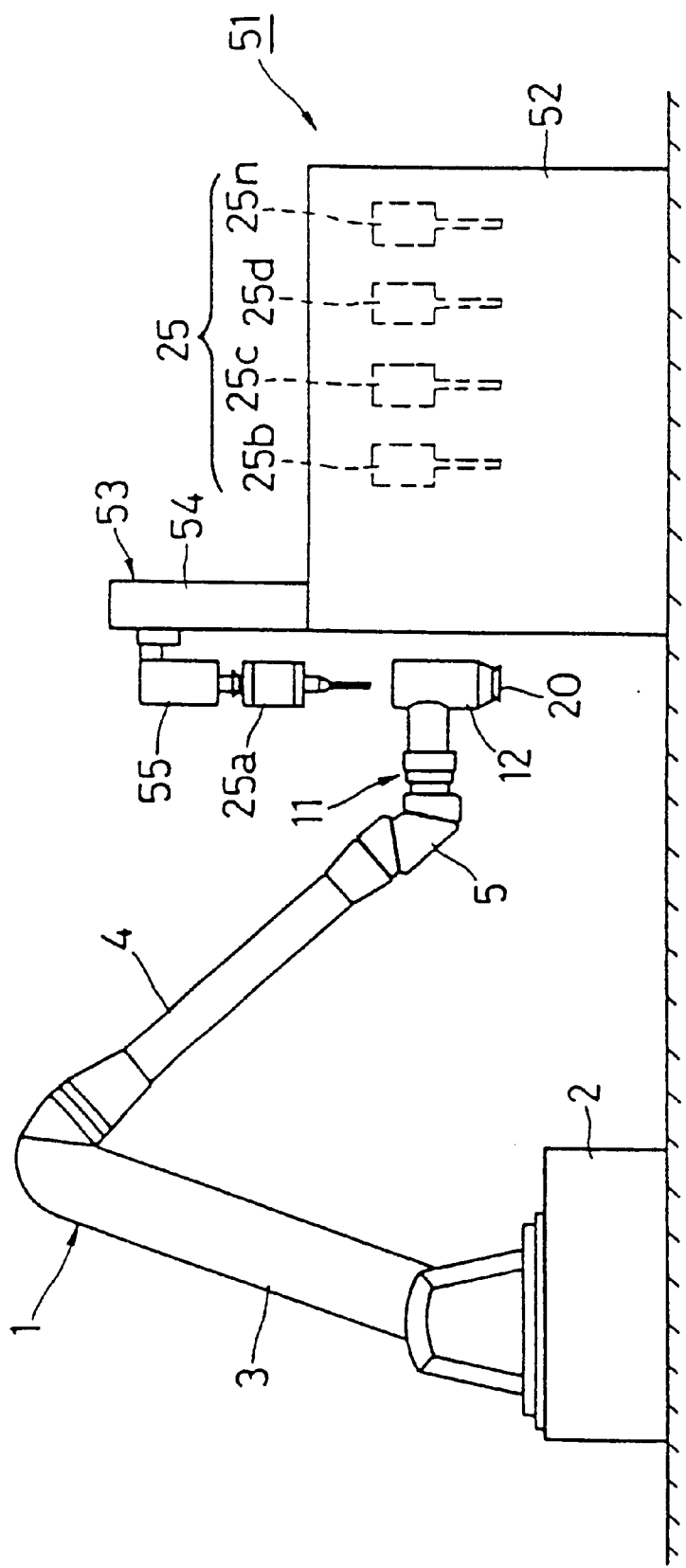
FIG. 1 is a schematic front view of an automatic coating apparatus, adopted as a first embodiment of the present invention.

Hereafter, the automatic coating apparatus according to the present invention is described more particularly by way of its preferred embodiments with reference to the accompanying drawings.

Shown in FIGS. 1 through 7 is a first embodiment of the present invention, in which indicated at 1 is a coating robot employed as a working mechanism. The coating robot 1 is largely constituted by a base 2, a vertical arm 3 which is rotatably and pivotally supported on the base 2, a horizontal arm 4 which is pivotally connected to a fore end portion of the vertical arm 3, and a wrist 5 which is provided at a fore distal end of the horizontal arm 4.

Figure 2:
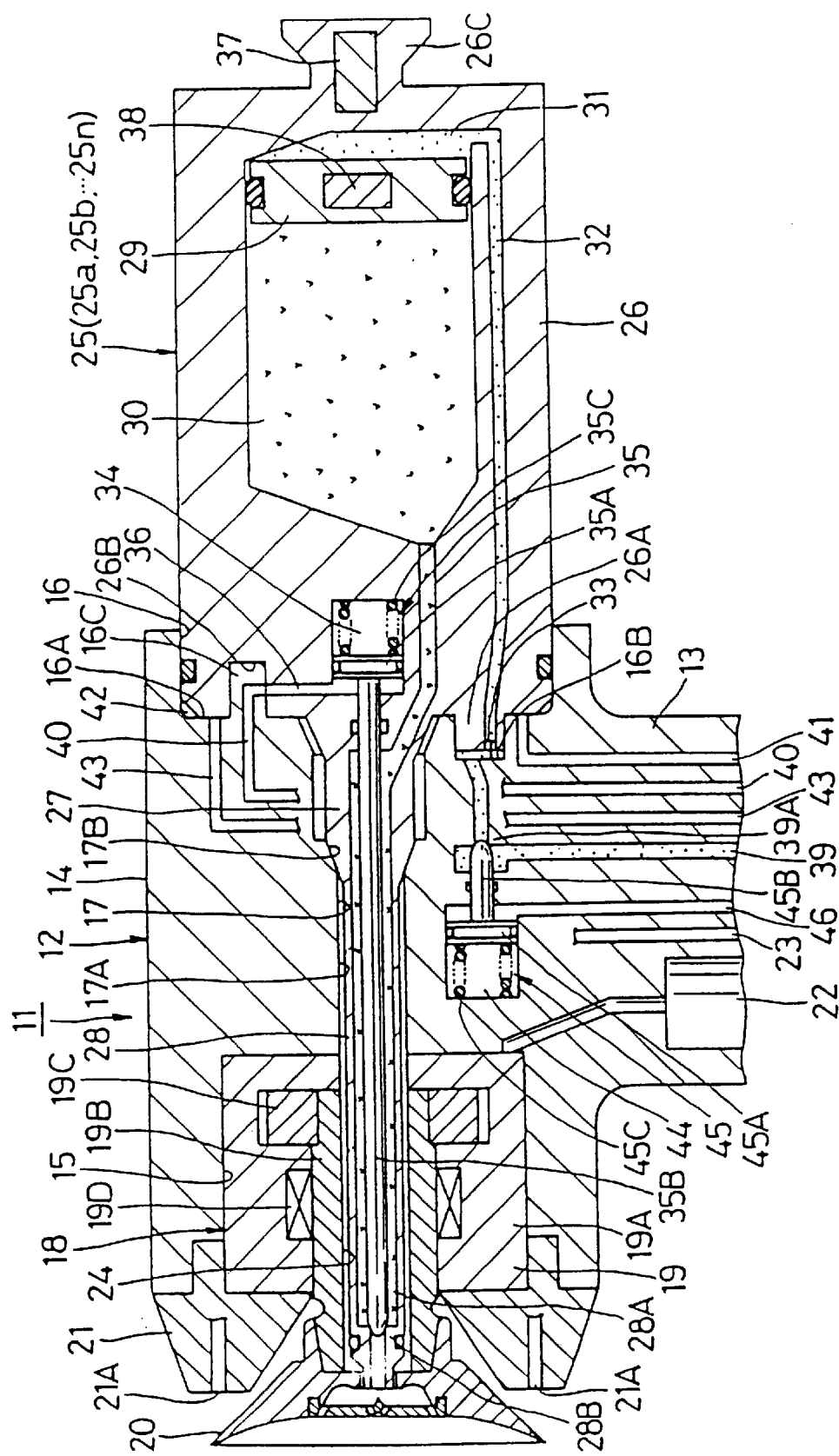
FIG. 2 is an enlarged vertical sectional view of a rotary atomizing head type coating machine shown in FIG. 1.

Indicated at 11 is a rotary atomizing head type coating apparatus (hereinafter referred to as "coating apparatus 11" for brevity) which is supported on the coating robot 1. As shown in FIG. 2, the coating apparatus 11 is largely constituted, as described in greater detail hereinafter, by a housing 12, feed tube passage holes 17 and 24, a coating machine 18, a paint cartridge 25, a paint valve 35, and a thinner valve 45.

Indicated at 12 is the housing which is formed of engineering plastics such as PTFE, PEEK, PEI, POM, PI, PET and the like and attached to the wrist 5, the housing 12 including a neck portion 13 which is detachably attached to the distal end of the wrist 5, and a head portion 14 which is formed integrally at the fore end of the neck portion 13.

In this instance, the housing 12 is provided with a coating machine mount portion 15 and a cartridge mount portion 16, each in the form of a cylindrical cavity, on the front and rear sides of the head portion 14, respectively. Further, female and male coupling portions 16B and 16C are provided separately at the bottom 16A of the cartridge mount portion 16 for fitting engagement with male and female coupling portions 26A and 26B which are provided on the side of a container 26 as will be described hereinafter. The female and male coupling portions 16B and 16C on the cartridge mount portion 16 function to orient the container 26 into position in the circumferential direction as the container 26 is mounted on the cartridge mount portion 16.

Indicated at 17 is the feed tube passage hole which is provided on the side of the housing and formed between and in communication with the coating machine mount portion 15 and the cartridge mount portion 16. This feed tube passage hole 17 on the side of the housing is composed of a front portion in the form of a feed tube passage portion 17A of a small diameter and a rear portion in the form of a conically converging portion 17A. In this instance, the feed tube passage portion 17A is formed in coaxial relation with the feed tube passage hole 24 which is provided on the side of the coating machine as will be described hereinafter. On the other hand, the conically converging portion 17B is brought into abutting and fitting engagement with a conical projection 27 which is provided on the side of the paint cartridge 25 as will be described hereinafter, for orienting the conical projection into position in both axial and radial directions.

Indicated at 18 is the coating machine which is set in the coating machine mount portion 15 of the head portion 14. The coating machine 18 is largely constituted by an air motor 19 including a motor case 19A, rotational shaft 19B, air turbine 19C and air bearing 19D, a rotary atomizing head 20 to be put in rotation by the air motor 19 for centrifugally atomizing supplied paint into finely divided particles and spraying same toward a coating object, and a shaping air ring 21 provided on the front side of the air motor 19. The shaping air ring 21 is bored with a multitude of shaping air outlet holes 21A on its outer peripheral side for spurting shaping air toward paint releasing edges of the rotary atomizing head 20 to shape released paint particles into a predetermined spray pattern.

Designated at 22 is a high voltage generator which is provided on the neck portion 13 of the housing 12. For example, the high voltage generator 22 is constituted by a Cockcroft circuit which is adapted to elevate a source voltage from a power supply (not shown) to a high voltage of from −60 kv to −120 kv. The output side of the high voltage generator 22 is connected, for example, to the air motor 19 to apply a high voltage to the rotary atomizing head 20 through the rotational shaft 19B of the air motor for directly charging paint particles.

Indicated at 23 is a plural number of air passages which are connected from a control air source (not shown), for supplying turbine air, bearing air and brake air to be supplied to the air motor for the control thereof, in addition to shaping air to be supplied to the shaping air ring for shaping the paint spray pattern. In the drawings, only one air passage is shown to represent various air passages just mentioned.

Indicated at 24 is the feed tube passage hole which is provided on the side of the coating machine, axially through the rotational shaft 19B of the air motor 19. This feed tube passage hole 24 on the side of the coating machine has its base end opened to the feed tube passage hole 17A on the side of the housing and its fore end opened into the rotary atomizing head 20. Further, the feed tube passage hole 24 is formed in coaxial relation with the feed tube passage portion 17A of the feed tube passage hole 17 on the part of the housing. The feed tube 28 of the paint cartridge 25 is extractably passed into these feed tube passage holes 17 and 24.

Figure 3:
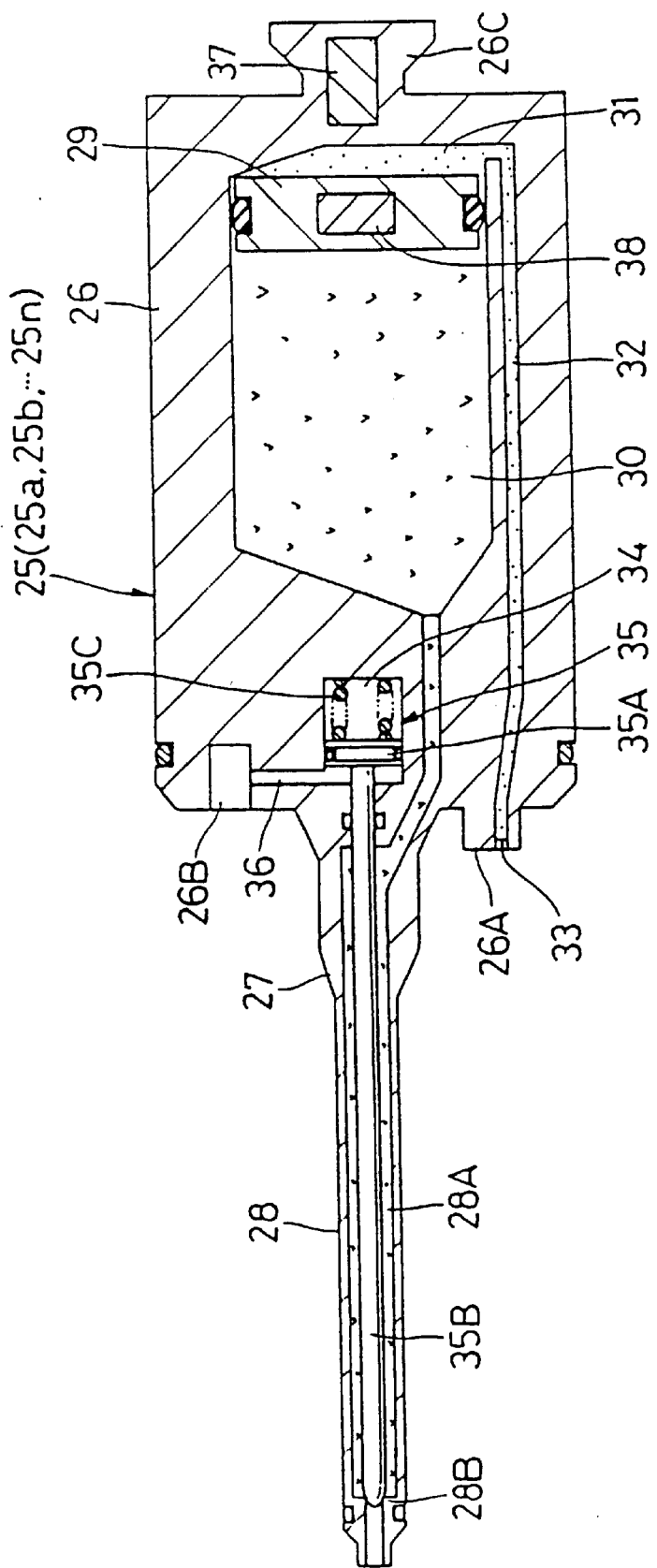
FIG. 3 is an enlarged vertical sectional view of a paint cartridge.

Denoted at 25a, 25b, . . . 25n are paint cartridges of different colors (hereinafter referred to simply as "cartridges 25" for brevity) which are filled with paint of different colors to be supplied to the rotary atomizing head 20. As shown in FIG. 3, each one of these cartridges 25 is largely constituted by a container 26, a conical projection 27 which is provided at a front end of the container 26, a feed tube 28 which is extended out axially forward from the conical projection 27, a piston 29 which is fitted in the container 26 as a movable partition wall, and a thinner passage 32 which is provided on the side of the paint cartridge to supply a paint extruding liquid therethrough.

The container 26 of the paint cartridge 25 is formed of a non-magnetic engineering plastics, for example, such as PTFE, PEEK, PEI, POM, PI, PET and the like, and provided with a cylindrical body (a cylinder) of a diameter which can removably fit in the cartridge mount portion 16 on the housing. Further, the container 26 is provided with male and female coupling portions 26A and 26B on its front end face in confronting positions relative to the female and male coupling portions 16B and 16C on the side of the cartridge mount portion 16, respectively. The container 26 is closed at its base or rear end, and provided with a knob 26C of an outwardly diverging shape integrally at the rear end. This knob 26C is adapted to be gripped by gripper claws 66 of a cartridge gripper 56 which will be described in greater detail hereinafter. The above-mentioned male and female coupling portions 26A and 26B serve to orient the container 26 into position in the circumferential direction when the container 26 is set in the cartridge mount portion 16.

Indicated at 27 is a conical projection which is formed integrally at the fore end of the container 26. This conical projection 27 is brought into abutting and fitting engagement with the conically converging portion 17B when the container 26 of the paint cartridge 25 is set in the cartridge mount portion 16 of the housing 12, for orienting the container 26 into position in both axial and radial directions.

The feed tube 28 which is provided at the distal end of the conical projection 27 is internally provided with a coaxial paint supply passage 28A, which has its base end connected to a paint reservoir chamber 30, which will be described hereinafter, and has its fore end opened toward the rotary atomizing head 20. Further, provided on the inner periphery of a fore end portion of the feed tube 28 is a valve seat 28B which is formed by reducing the diameter of part of above-mentioned paint supply passage 28A. A valve member 35B of the paint valve 35, which will be described hereinafter, is seated on and off the valve seat 28B. The feed tube 28 is arranged in such a length that its fore end is extended into the rotary atomizing head 20 when the paint cartridge 25 is set in position in the cartridge mount portion 16.

Figure 4:
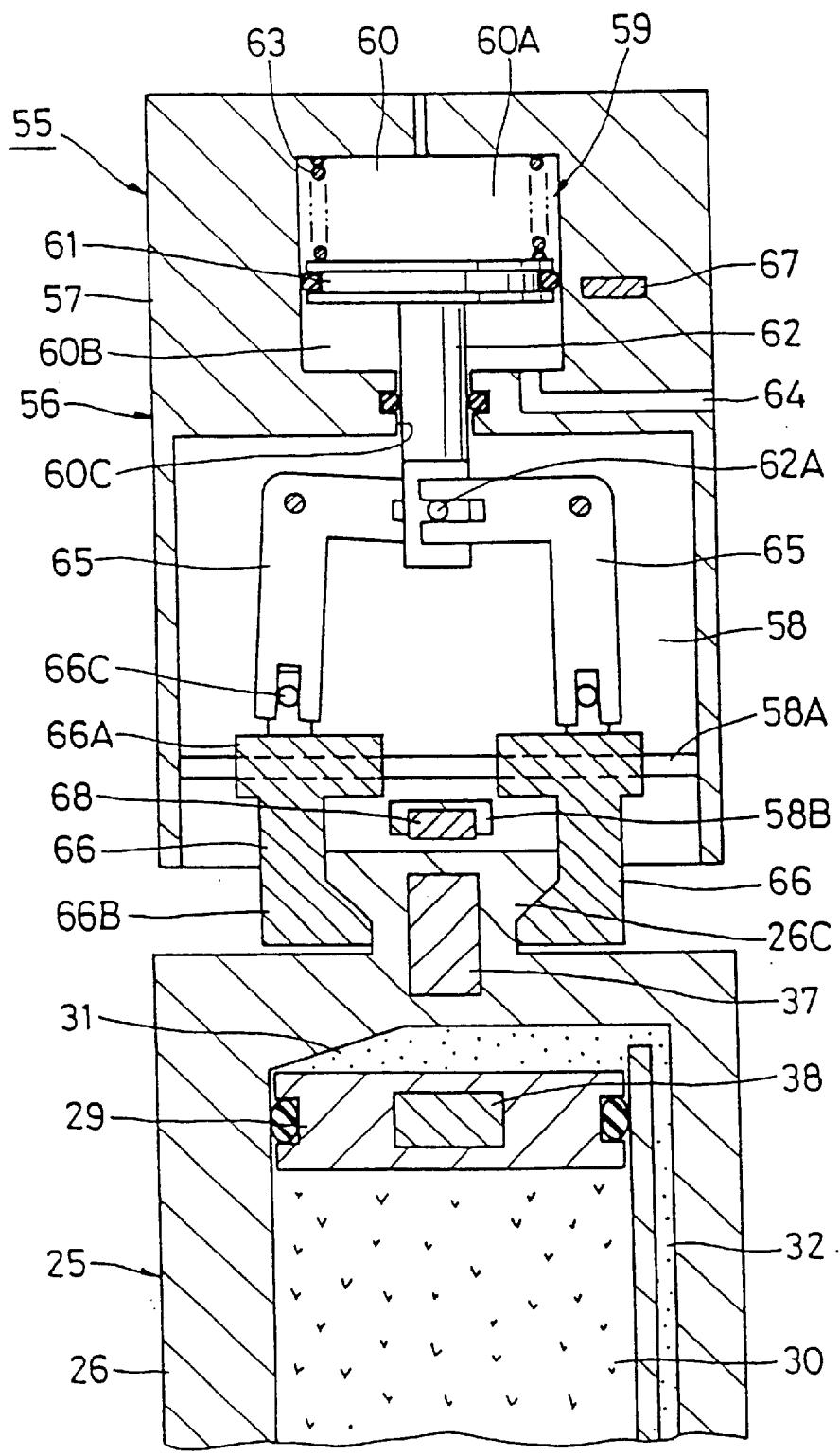
FIG. 4 is an enlarged vertical sectional view of a cartridge gripper assembly employed in the first embodiment, showing the gripper in an operational phase of gripping a paint cartridge thereon.

On the other hand, the piston 29 is axially slidably received in the container 26 to function as a movable partition wall. Similarly to the container 26, the piston 29 is formed of non-magnetic engineering plastics. By the piston 29, the internal space of the container 26 is divided into a paint reservoir chamber 30, which is in communication with the paint supply passage 28A of the feed tube 28, and a thinner chamber 31 to which thinner is supplied as a paint extruding liquid. In this instance, as shown in FIGS. 2 to 4, the piston 29 is moved to the rear end of the container 26 when a predetermined amount of paint is replenished into the paint reservoir chamber 30. Namely, this rear end position of the piston corresponds to a full or complete replenishment position.

Indicated at 32 is a thinner passage on the side of the paint cartridge, the thinner passage 32 being extended axially through an outer peripheral portion of the container 26 and having one end opened in the distal end face of the male coupling portion 26A of the container 26 and the other end communicated with the above-mentioned thinner chamber 31. As thinner is supplied to the thinner chamber 31 through this thinner passage 32 on the side of the paint cartridge, the piston 29 is pushed toward the feed tube 28 to extrude paint in the paint reservoir chamber 30 toward the rotary atomizing head 20.

In this regard, thinner to be employed as a paint extruding liquid should be of a type which has electrically insulating properties or high electric resistance, in order to prevent the high voltage from the high voltage generator 22 from leaking through thinner. In case thinner is used as an extruding liquid, it contributes to retain inner wall surfaces of the container 26 always in a wet state as the piston 29 is displaced within the container 26, thereby preventing paint from getting dried up and solidifying on the inner wall surfaces and stabilizing frictional resistance between the piston 29 and the inner wall surfaces of the container 26 to ensure smooth movement of the piston 29. Besides, it also contributes to enhance the tightness of the seal between the piston 29 and inner wall surfaces of the container 26.

Indicated at 33 is a quick coupling which is provided within the male coupling portion 26A of the container 26, at an open end of the thinner passage 32 on the side of the paint cartridge. When the paint cartridge 25 is set in the cartridge mount portion 16, bringing the male coupling portion 26A into engagement with the female coupling portion 16B, a valve in the quick coupling 33 is opened to communicate the thinner passage 32 on the side of the cartridge with the thinner passage 39 on the side of the housing which will be described hereinafter. On the other hand, when the container 26 is removed from the cartridge mount portion 16, disengaging the male coupling portion 26A from the female coupling portion 16B, the thinner passage 32 on the side of the paint cartridge is closed by the action of a spring to prevent thinner from flowing out of the thinner passage 32.

Indicated at 34 is a paint valve accommodating portion which is provided in a front end portion of the container 26, and at 35 a paint valve which is received in the paint valve accommodating portion 34. In this instance, the paint valve 35 is arranged as an air-piloted directional control valve, including a piston 35A which is slidably fitted in the paint valve accommodating portion 34 in such a way as to define a spring chamber and a pressure receiving chamber on its opposite sides, an elongated valve member 35B which is connected to the piston 35A at its base end and extended into the paint supply passage 28A of the feed tube 28 at its fore end to seat on and off the valve seat 28B, and a valve spring 35C which is provided in the spring chamber of the paint valve accommodating portion 34 and adapted to act on the valve member 35B through the piston member 35A urging the valve member 35C to set on the valve seat 28B.

Normally, the valve member 35C of the paint valve 35 is seated on the valve seat 28B under the influence of the biasing action of the valve spring 35C, thereby closing the paint supply passage 28A and suspending paint supply to the rotary atomizing head 20. On the other hand, as soon as pilot air is supplied to the pressure receiving chamber in the paint valve accommodating portion 34 from a pilot air source through a pilot air piping system (both not shown) via the pilot air passage 40 on the side of the housing and the pilot air passage 36 on the side of the paint cartridge, the valve member 35B is unseated from the valve seat 28B against the action of the valve spring 35C to start supply of paint from the paint reservoir chamber 30 to the rotary atomizing head 20. In this instance, one end of the pilot air passage 36 is opened in an inner peripheral surface of the female coupling portion 26B of the container 26, while the other end is communicated with the pressure receiving chamber of the paint chamber 34.

Designated at 37 is a core member which is provided in a base end portion on the rear side of the container 26. This core member 37 is formed of magnetic metal material, for example, such as silicon steel, pure iron or the like as a magnetic strip of a round cylindrical shape and embedded in the knob 26C substantially in coaxial relation with the paint cartridge 25. The core member 37 is magnetized on approach thereto of a permanent magnet 38 which is provided on the piston 29 as will be described hereinafter. Further, the core member 37 is located in such a position that it can be detected by a replenishment level detector switch 68 when the knob 26C is gripped by gripper claws 66 of the cartridge gripper 55 which will be described hereinafter. Namely, when magnetized by the permanent magnet 38, the core member 37 functions as a relay member between the permanent magnet 38 and the replenishment level detector switch 68 to let the latter detect the approaching permanent magnet 38.

For the permanent magnet 38 to be embedded in the piston 29, for example, there may be used permanent magnetic material such as Alnico magnet, cobalt magnet, ferrite magnet or the like. The permanent magnet 38 is displaced within the paint reservoir chamber 30 along with the piston 29 depending upon the paint content in the paint reservoir chamber 30 in a paint replenishing operation. As the piston 29 is displaced to a full position, the core member 37 is magnetized by the approaching piston 29.

Indicated at 39 is a thinner passage which is provided on the side of the housing 12. The thinner passage 39 is extended axially through and within the neck portion 13 and bent backward in an L-shape at a position behind the female coupling portion 16B. One end of this thinner passage 39 on the side of the housing is connected to a thinner supply device (not shown), while the other end is opened in a bottom portion of the female coupling portion 16B on the cartridge mount portion 16. The angularly bent portion of the thinner passage 39 on the side of the housing is arranged to provide a valve seat 39A for seating and unseating a valve member 45B of a thinner valve 45 which will be described hereinafter.

Denoted at 40 is a pilot air passage which is provided on the side of the housing 12. One end of this pilot air passage 40 is connected to a paint valve pilot air source through pilot air piping (both not shown). The other end of the pilot air passage 40 is opened in a circumferential surface of the male coupling portion 16C, which is provided at the bottom 16A of the cartridge mount portion 16, at a position which confronts the pilot air passage 36 on the side of the paint cartridge.

Indicated at 41 is an air suction passage which is provided in the housing 12 and opened in the bottom portion 16A of the cartridge mount portion 16. This air suction passage 41 is connected to a vacuum source through vacuum piping (both not shown). This air suction passage 41 functions to suck air out of a vacuum space 42, which is formed at a deep portion of the cartridge mount portion 16 on the inner side of the container 26, for gripping the container 26 fixedly in the cartridge mount portion 16 with suction force.

Further, indicated at 43 is an ejection air supply passage which is provided in the housing 12 and opened at the bottom 16A of the cartridge mount portion 16. This ejection air supply passage 43 is connected to an ejection air source through air piping (both not shown). Through the ejection air passage 43, ejection air supplied to the vacuum space 43 to cancel the suction grip on the paint cartridge 25, thereby permitting to dismantle the paint cartridge 25 from the housing.

Indicated at 44 is a thinner valve accommodating portion which is provided in the head portion 14 of the housing 12, and at 45 a thinner valve which is provided in the thinner valve accommodating portion 44. In this instance, similarly the paint valve 35, the thinner valve 45 is arranged as an air-piloted directional control valve, including a piston 45A which is slidably fitted in the thinner valve accommodating portion 44 in such a way as to define a spring chamber and a pressure receiving chamber on its opposite sides, a valve member 45B which is connected to the piston 45A at its base end and extended into the thinner passage 39 on the side of the housing at its fore end to be seated on and off the valve seat 39A, and a valve spring 45C which is provided in the valve chamber of the thinner valve accommodating portion 44 and adapted to act on the valve member 45B through the piston 45A, urging the valve member 45A into a seated position.

Normally, the valve member 45B of the thinner valve 45 is seated on the valve seat 39A in the thinner passage 39 on the side of the housing under the influence of the biasing action of the valve spring 45C, thereby closing the thinner passage 39 to suspend thinner supply to the thinner chamber 31. On the other hand, as soon as pilot air is supplied to the pressure receiving chamber from the thinner valve pilot air source via pilot air piping (both not shown) and through the pilot air passage 46, the valve member 45B is unseated from the valve seat 39A against the action of the valve spring 45C to start thinner supply to the thinner chamber 31. In this instance, one end of the pilot air passage 46 is connected to the thinner valve pilot air source through pilot air piping, while the other end is communicated with the pressure receiving chamber of the thinner valve accommodating portion 44.

Description is now directed to a cartridge changer which accommodates a plural number of paint cartridges of different colors and adapted to replaceably load and unload paint cartridges to and from the coating apparatus.

The cartridge changer which is indicated at 51 is located in a coating booth and in a position in the vicinity of the coating robot 1 (FIG. 1). The cartridge changer 51 is largely constituted by a cartridge storage rack 52 which is arranged to store a plural number of paint cartridges 25a, 25b, . . . 25n of different colors, and a cartridge loader 53 which is arranged to load and unload paint cartridges 25 to and from the cartridge mount portion 16 on the housing 12. Further, provided in the vicinity of the cartridge changer 51 and alongside a working position of the cartridge loader 53 is an atomizing head washer (not shown) for washing off deposited previous color from the rotary atomizing head 20.

The cartridge loader 53 is largely constituted by a post 54 which is erected on the cartridge storage rack 52, and a cartridge gripper assembly 55 which is vertically movably mounted on the post 54.

The cartridge gripper assembly 55, which is employed in the present embodiment, is arranged to grip paint cartridges 25 at the time of mounting a replenished paint cartridge 25 on the cartridge mount portion 16 of the housing 12 in place of an empty paint cartridge 25 which has been consumed in a previous coating operation, and vertically movably supported on the post 54. More particularly, as shown in FIG. 4, the cartridge gripper assembly 55 is largely constituted by a cartridge gripper or gripper member 56, a grip detector switch 67 and a replenished paint level detector switch 68, which will be described hereinafter.

The cartridge gripper 56, which is a major component of the cartridge gripper assembly 55, is constituted by a casing 57, a cylinder 59 and gripper claws 66.

More particularly, the casing 57 of the cartridge gripper 56 is formed of non-magnetic engineering plastics, for example, such as PTFE, PEEK, PEI, POM, PI, PET or the like in the shape of a rectangular block which is extended in the vertical direction. Provided in a lower portion of the casing 57 is a lower open cavity 58 to accommodate link arms 65 and gripper claws 66 which will be described hereinafter. A transversely extending claw guide 58 is located in the lower cavity 58A at a position close to an open lower end of the latter. Located immediately beneath the claw guide 58A is a switch mount beam 58B to mount thereon the above-mentioned replenishment level detector switch 68.

Indicated at 59 is a piston-cylinder which is employed as a reciprocating actuator, and constituted by a cylinder 60, a piston 61, a piston rod 62 and a coil spring 63 which will be described in greater detail hereafter.

In this instance, the cylinder 60 is formed in an upper end portion of the casing 57 and in the shape of a circular bore having an axis in the vertical direction. The piston 61 is formed of magnetic material, for example, such as silicon steel, pure iron or the like, and slidably fitted in the cylinder 60, dividing the latter into an upper spring chamber 60A and a lower pressure receiving chamber 60B. Further, the piston rod 62 is connected to the piston 61 at its base end, and projected into the lower cavity 58 at its fore end through a rod passage hole 60C. Provided at the lower end of the piston rod 62 are a pair of connector projections 62A (only one of which is shown in the drawing) for engagement with link arms 65. Further, by the coil spring 63 which is provided in the spring chamber 60A, the piston 61 is urged in a direction of projecting the piston rod 62.

Normally, the piston rod 62 of the piston-cylinder 59 is extended out in the downward direction by the biasing action of the coil spring 63. Further, when air is supplied to the pressure receiving chamber 60B through an air passage 64, the piston rod 62 is retracted in the upward direction against the action of the coil spring 63.

Indicated at 65 are a pair of link arms which are located within the lower cavity 58. Each one of these link arms 65 is bent at a longitudinally intermediate portion to present an L-shape as a whole, and the intermediate bent portion is pivotally supported on the casing 57 through a pin. Further, one end of each link arm 65 is engaged with the connector projection 62A at the lower end of the piston rod 62, while the other end is engaged with a connector projection 66C on one of gripper claws 66 which will be described hereinafter. The paired link arms 65 function to move the gripper claws 66 away from each other when the piston rod 62 of the piston-cylinder 59 is extended in the downward direction, and to move the gripper claws 66 toward each other when the piston rod 62 is retracted in the upward direction.

Indicated at 66 are the pair of gripper claws which are provided on the lower side of the casing 57. Similarly to the casing 57, the gripper claws 66 are formed of non-magnetic synthetic resin material. In this instance, each one of the gripper claws 66 is constituted by a slider 66A which is supported on the claw guide 58A in the lower cavity 58 for movement in the transverse direction, a claw portion 66B which is extended downward from the slider 66A and bent inward in a fore distal end portion, and a connector projection 66C which is extended upward from the slider 66A. Accordingly, the gripper claws 66 are moved toward each other in the transverse direction to grip the knob 26C on the container 26 of the paint cartridge 25. At the time of releasing the container 26, the gripper claws 66 are moved away from each other.

Figure 5:
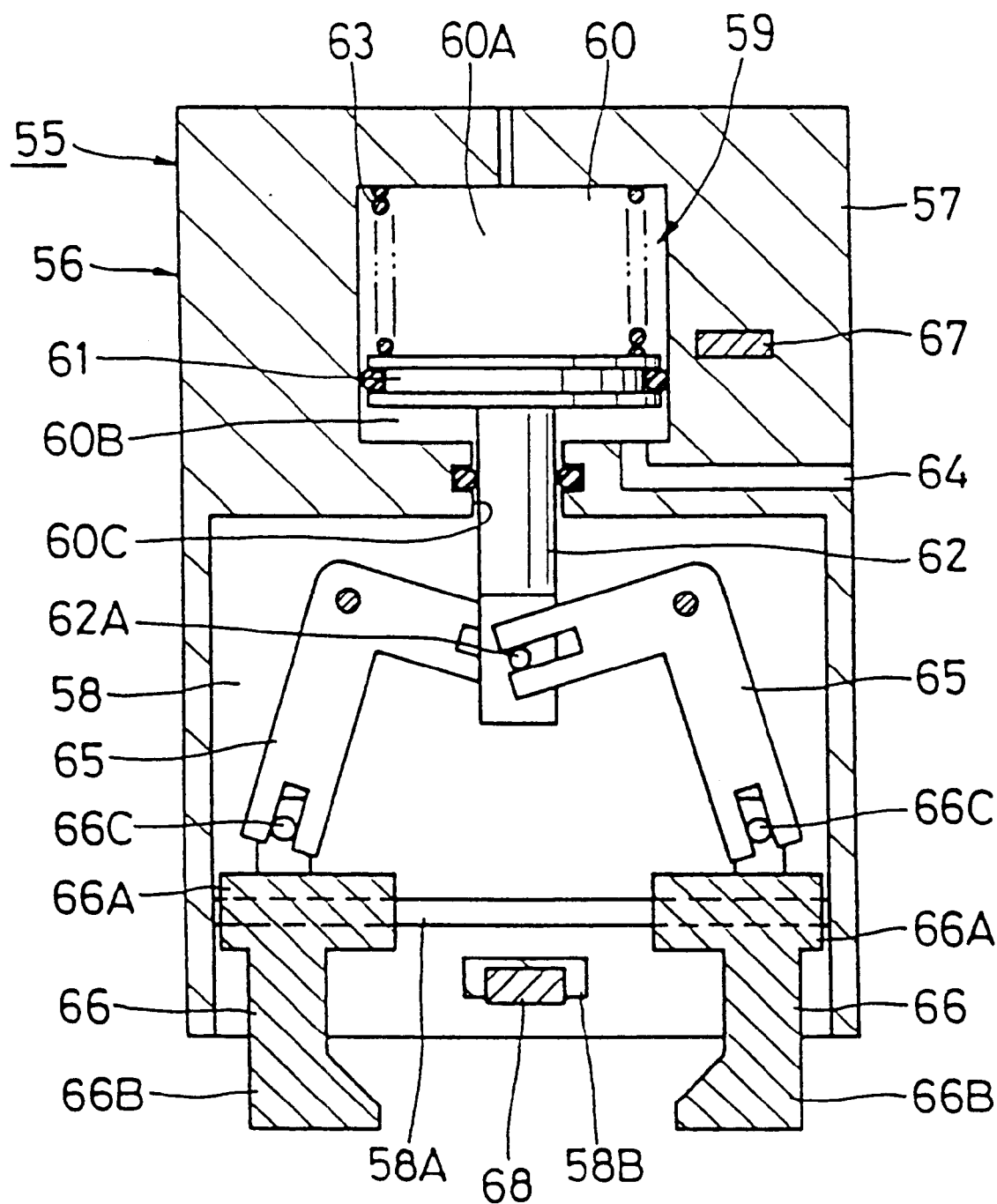
FIG. 5 is a schematic vertical sectional view of the cartridge gripper assembly having gripper claws in spread-apart positions.

With the cartridge gripper 56 which is arranged as described above, when the piston rod 62 of the piston-cylinder 59 is extended downward by the biasing force of the coil spring 63 as shown in FIG. 5, the link arms 65 which are connected to the piston rod 62 are moved away from each other into an open state. At this time, the piston 61 of the piston-cylinder 59 is stopped at the bottom end of the cylinder 60 to hold the gripper claws 66 in the open position shown in FIG. 5.

Figure 6:
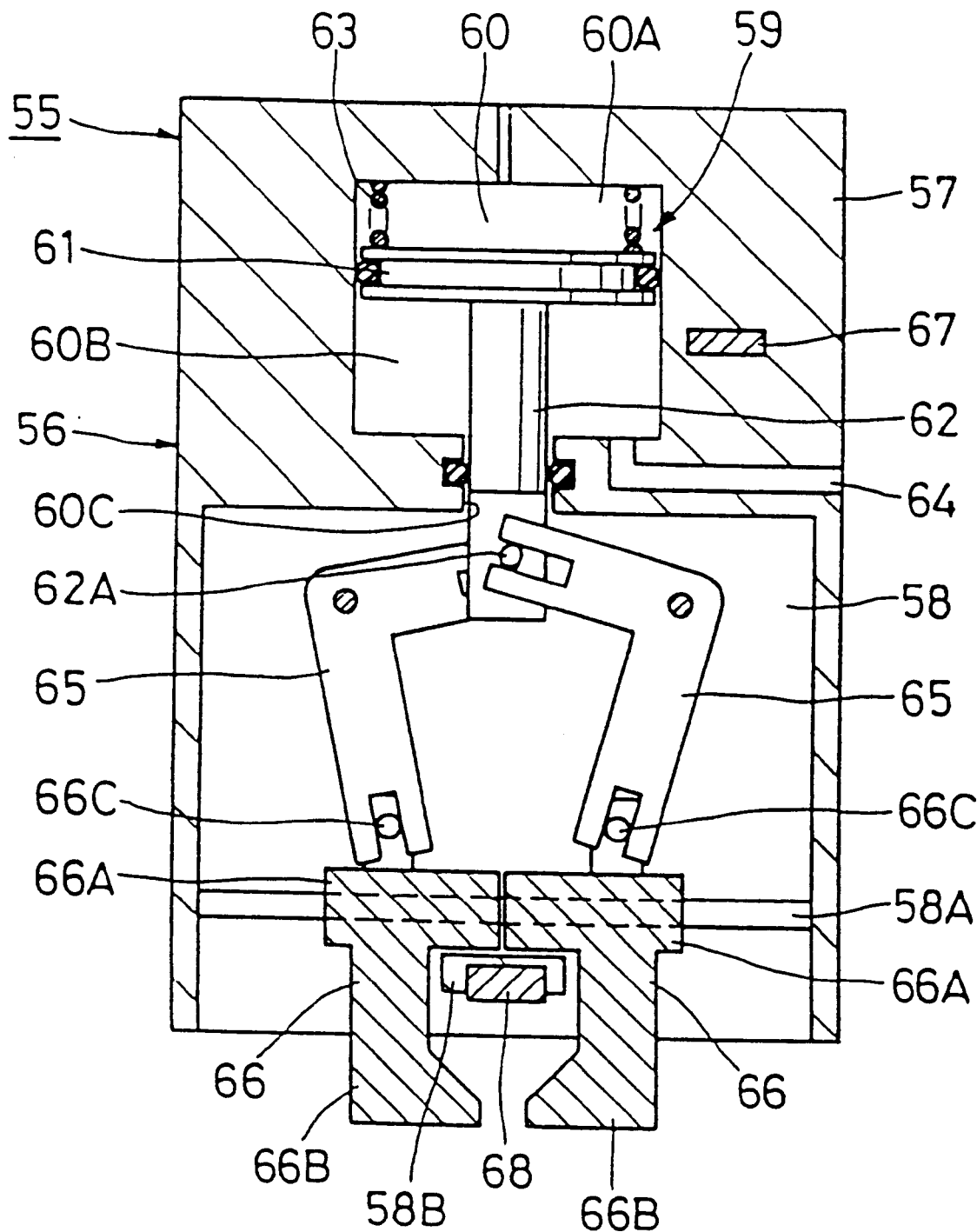
FIG. 6 is a schematic vertical sectional view of the cartridge gripper assembly having the gripper claws in abutting engagement with each other.

On the other hand, as soon as air is supplied to the pressure receiving chamber 60B, the piston rod 62 is retracted in the upward direction by the supplied air pressure, and, as shown in FIG. 6, the gripper claws 66 are moved toward each other by the link arms 65 and finally abutted against each other. At this time, the piston 61 of the piston-cylinder 59 is stopped at the top end of the cylinder 60 to hold the gripper claws 66 in the abutted position shown in FIG. 6.

Figure 7:
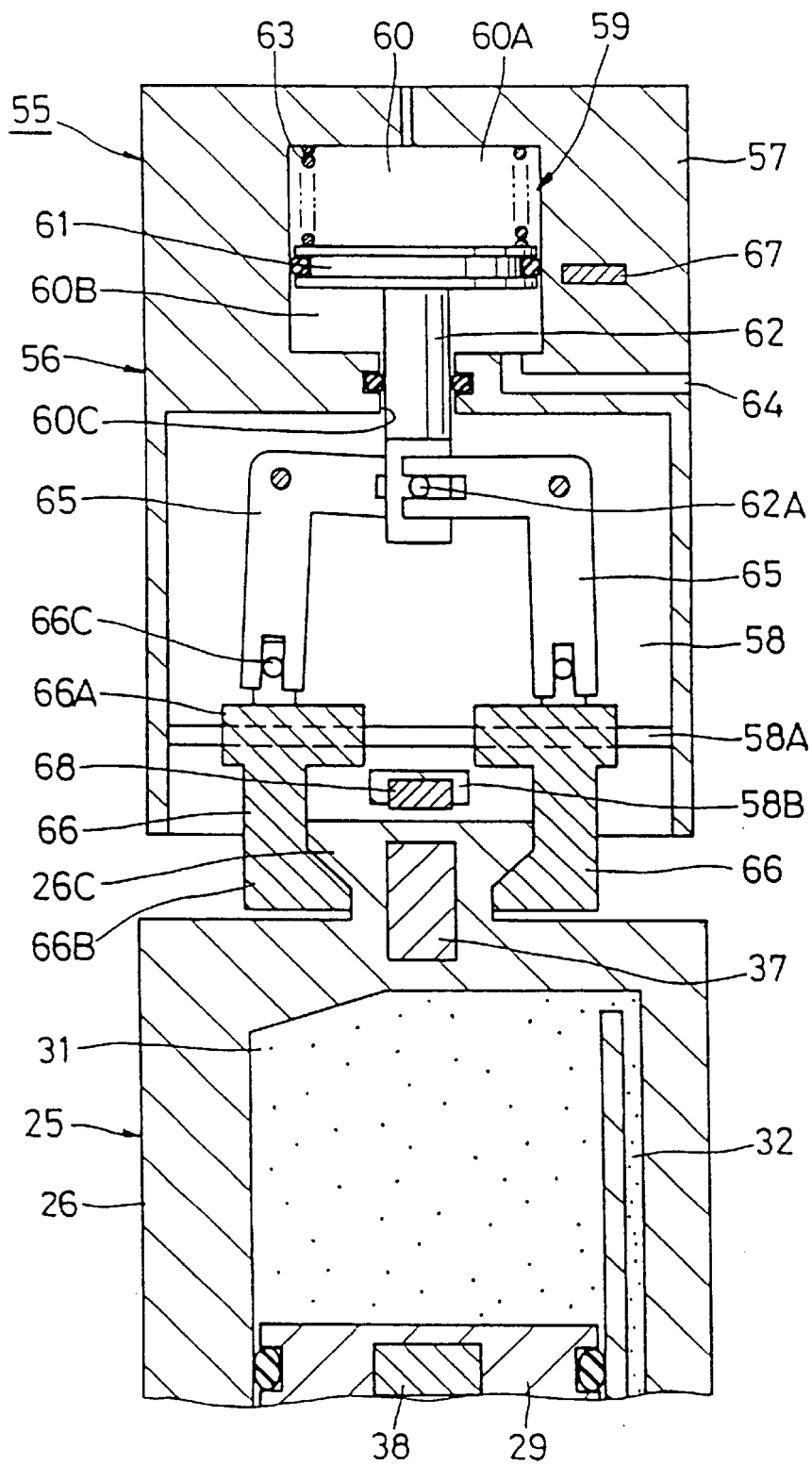
FIG. 7 is an enlarged sectional view of the cartridge gripper assembly in an operational phase of gripping a paint cartridge which has not been replenished with paint.

When the gripper claws 66 are moved toward each other, the knob 26C of the container 26 is set in a predetermined position between the claw portions 66B of the respective gripper claws 66. As soon as the claw portions 66B of the gripper claws 66 come into abutting engagement with the opposite sides of the knob 26C as shown in FIGS. 4 and 7, each one of the gripper claws 66 is stopped in that position. At this time, the piston 61 of the piston-cylinder 59 is stopped below an axially intermediate position within the cylinder 60 to retain a cartridge gripping position as shown in FIGS. 4 and 7.

Indicated at 67 is the grip detector switch which is provided on the cartridge gripper 56. More specifically, the grip detector switch 67 is in the casing 57 at a position on the peripheral side of the cylinder 60. Namely, the grip detector switch 67 is located in such a position as to detect the piston 61 when the latter is in the cartridge gripping position. For example, the grip detector switch 67 is constituted by a magneto-sensitive proximity switch which is composed of a permanent magnet and a magneto-resistance device or a hall device (both not shown). Consequently, it is the function of the grip detector switch 67 to produce a detection signal to a control unit (not shown) when the piston 61 is located in the cartridge gripping position.

Indicated at 68 is the replenishment level detector switch which is provided on the cartridge gripper 56. More specifically, the replenishment level detector switch 68 is mounted on the switch mount beam 58B which is provided in the lower open cavity 58 of the casing 57. Further, the replenishment level detector switch 68 is located in such a position that, when the knob 26C is gripped by the gripper claws 66, it comes to the proximity of the core member 37 which is embedded in the container 26. Similarly to the above-described grip detector switch 67, the replenishment level detector switch is constituted by a magneto-sensitive proximity switch which is composed of a magneto-resistance device and a hall device or the like. Consequently, as soon as the permanent magnet 38 comes to a proximal end, the replenishment level detector switch 68 detects this through the core member 37 and produces a detection signal to a control unit.

The automatic coating apparatus according to the present embodiment is operated in the manner as explained in the following description, which is focused particularly on the cartridge gripper assembly 55 which is unique to the present invention.

Firstly, as shown in FIG. 1, for picking up a paint cartridge, for example, a paint cartridge 25a of color a from a number of paint cartridges 25a, 25b, . . . 25n of different colors which are stored on the cartridge rack 52, the cartridge loader 53 is moved to locate the cartridge gripper assembly 55 at a position over the selected paint cartridge 25a of color a. In this state, the cartridge gripper assembly 55 is moved downward, and the knob 26C of the container 26 of the paint cartridge 25 is located between the gripper claws 66 of the gripper 56.

In a next phase, the piston rod 62 of the piston-cylinder 59 is retracted upward to move the gripper claws 66 toward each other for gripping the knob 26C of the container 26 between the gripper claws 66 as shown in FIG. 4.

In this gripping stage, getting hold of the knob 26C by the gripper claws 66, the piston 61 of the piston-cylinder 59 is stopped at the gripping position. Since the piston 61 is formed of magnetic material and the grip detector switch 67 is located alongside the gripping position of the piston 61, the location of the piston 61 in the gripping position is detected by the switch 67 and accordingly a control signal is produced to the control unit.

On the other hand, in the event of a failure in supplying air for driving the piston 61 or in the event of the gripper claws 66 being stuck in the open position due to a damage to the gripper 56, the piston 61 is pushed downward by the action of the coil spring 63 and the respective gripper claws 66 remain in the open state as shown in FIG. 5. Consequently, the piston 61 is stopped at the open position away from the grip detector switch 67 without actuating the latter.

Further, in the event the cartridge gripper assembly 55 is not located in a correct position despite air supply to the piston-cylinder or in case the paint cartridge 25a of color a is not set in position, the gripper claws 66 are held in the abutted state as shown in FIG. 6. Therefore, the piston 61 is stopped at the abutting position which is out of an operative range of the grip detector switch 67, without actuating the grip detector switch 67.

Thus, the grip detector switch 67 is actuated to produce a detection signal to the control unit only when the container 26 of the paint cartridge 25 is securely gripped between the gripper claws 66 of the cartridge gripper.

Furthermore, when the knob 26C of the container 26 is gripped between the gripper claws 66 of the cartridge gripper assembly 55, the piston 29 within the container 26 should be located in the full replenishment position as shown in FIG. 4. At this time, the approach of the permanent magnet 38 which is provided on the piston 29 is detected by the replenishment level detector switch 68 through the core member 37 provided on the container 26, so that a detection signal is produced to the control unit.

On the other hand, in case paint has not been fully replenished into the paint reservoir chamber 30 of the container 26 due to a trouble in a paint replenisher (not shown) or for other reasons, the permanent magnet 38 on the piston 29 located at a relatively large distance from the core member 37 on the container 26, so that the replenish level detector switch 68 remains in a de-actuated state.

Thus, the replenishment level detector switch 68 is actuated to produce a detection signal to the control unit only when the paint reservoir chamber 30 is fully replenished and the piston 29 is located in the full position.

The replenished paint cartridge 25a is moved to and set on the housing 12 of the coating apparatus after confirming the grip condition and the paint replenishment level in the paint cartridge 25a through the grip detector switch 67 and the replenishment level detector switch 68, respectively.

In this manner, according to the present embodiment, as a paint cartridge 25 is gripped by the gripper 56, the gripped state of the paint cartridge 25 can be confirmed through the grip detector switch 67. Accordingly, at the time of mounting the paint cartridge 25 on the housing 12, it can be transferred to and set in position in a secure manner. Further, the level of paint replenishment within the gripped paint cartridge 25 can be confirmed through the replenishment level switch 68. As a consequence, a deficiently replenished paint cartridge 25 can be prevented from being mounted on the housing 12 of the coating apparatus, thereby permitting to improve productivity by precluding coating defects which might result from deficiently replenishment to paint cartridges.

Further, since the container 26 of the paint cartridge 25 is provided with the knob 26C, the gripper claws 66 can securely grip the cartridge 25 by engagement with the knob 26C and can securely transfer same between the housing 12 and the cartridge changer 51.

Furthermore, since the core member 37 is provided on the container 26 of the paint cartridge 25 operatively in association with the permanent magnet 38 on the piston 29, it has become possible to detect by way of the replenishment level detector switch 68 that the piston. 29 is located in a full position as a result of replenishment of a predetermined amount of paint, namely, to conform clearly a state of paint replenishment in the gripped paint cartridge 25.

Figure 8:
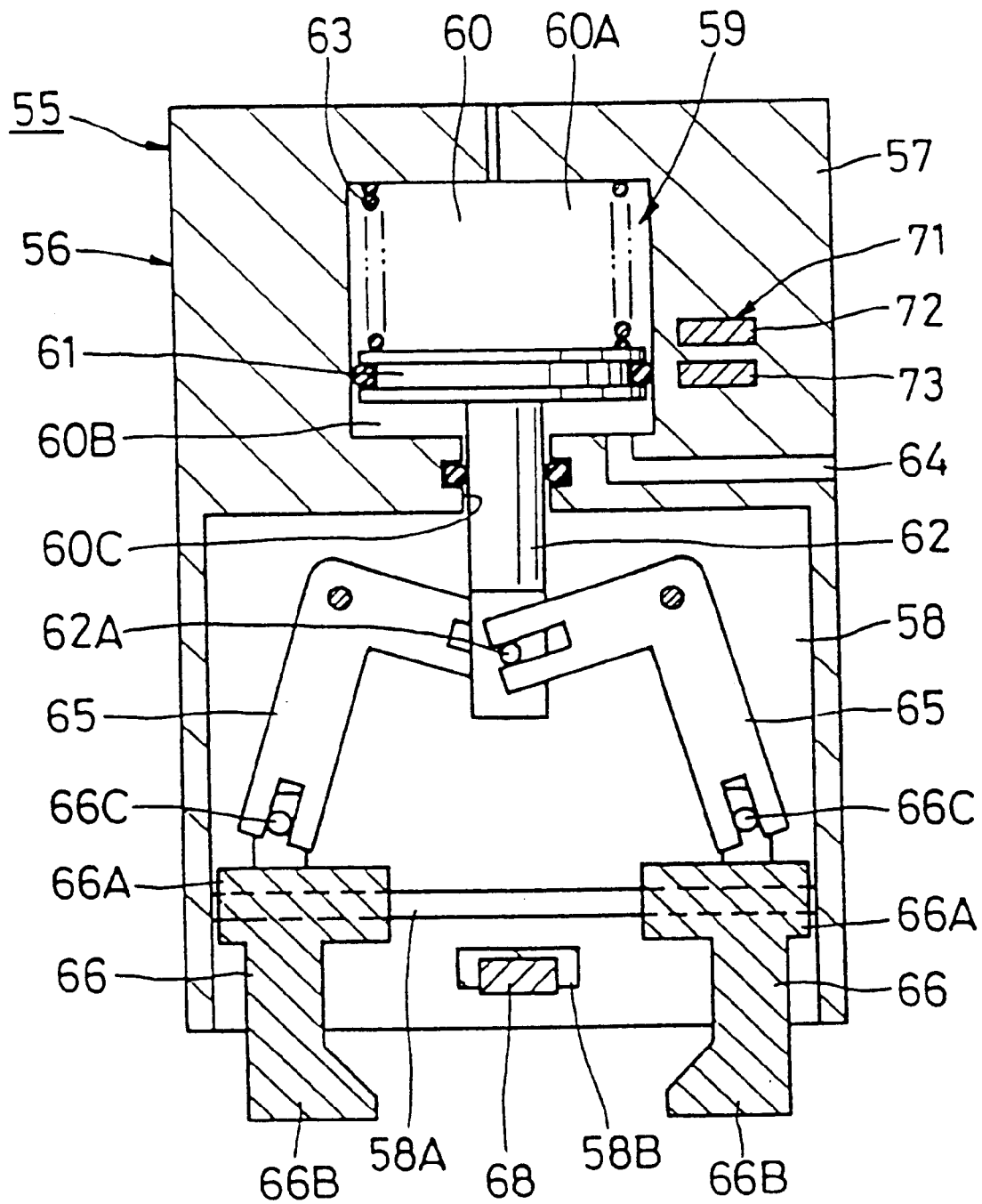
FIG. 8 is a vertical sectional view of a cartridge gripper assembly employed in a second embodiment of the present invention.

Turning now to FIG. 8, there is shown a second embodiment of the present invention, which has features in that the grip detector switch is constituted by a grip position detector switch which functions to detect displacement of the reciprocating actuator to a gripping position where a paint cartridge is gripped between the gripper claws, and an open position detector switch which functions to detect displacement of the reciprocating actuator to an open position where the gripper claws are spread open. In the following description of the second embodiment, those component parts which are common with the foregoing first embodiment are designated by reference numerals or characters to avoid repetitions of same explanations.

Indicated at 71 is a grip detector switch which is constituted by a grip position detector switch 72 for detecting the piston 61 in a gripping position, and an open position detector switch 73 for detecting the piston 61 in an open position.

Denoted at 72 is the grip position detector switch which is provided on the cartridge gripper 56. Similarly to the grip detector switch 67 in the foregoing first embodiment, the grip position detector switch 72 is located alongside a position at which the piston 61 is stopped when the knob 26C of a paint cartridge 25 is gripped between the gripper claws 66. The grip position detector switch 72 is likewise constituted by a magneto-sensitive proximity switch using a magneto-resistive device or a hall device (not shown). Thus, the grip position detector switch 72 is adapted to produce a detection signal to a control unit (not shown) only when the piston of magnetic material is located in a gripping position.

Indicated at 73 is the open position detector switch which is provided on the cartridge gripper 56 and located alongside an open position where the piston 61 is stopped when the gripper claws 66 are spread open. Similarly to the abovementioned grip position detector switch 72, the open position detector switch 73 is constituted by a magneto-sensitive proximity switch. Thus, the open position detector switch 73 is adapted to produce a detection signal to the control unit only when the piston 61 of magnetic material is located in the open position.

The present embodiment which is arranged as described above can produce substantially the same operational effects as the foregoing first embodiment.

However, according to the present embodiment, the open position detector switch 73 is provided to detect the piston 61 in the open position. Therefore, in this case, when the piston 61 is detected by the grip position detector switch 72, it means that a paint cartridge 25 is gripped by the gripper claws 66. Besides, when the piston 61 is detected by the open position detector switch 73, it means that the gripper arms 66 are in an open state. In case the piston 61 is detected by neither one of the grip position detector switch 72 and the open position detector switch 73, it means that the gripper claws 66 are abutted against each other in the same way as shown in FIG. 6.

In this manner, according to the present embodiment, operating conditions of the respective gripper claws 66 can be gripped in a more particular manner, permitting to control the cartridge changer 51 or to conduct diagnostic troubleshooting on the cartridge changer 51 more precisely.

In each one of the foregoing embodiments, the present invention has been described in connection with a rotary atomizing head type coating apparatus 11 which is mounted on a coating robot 1. However, it is to be understood that the present invention can be applied to a coating apparatus 11 which is mounted on a working mechanism other than the coating robot 1, for example, to a coating apparatus which is mounted on a reciprocator or the like.

Further, in the foregoing embodiments, the grip detector switch 67, the grip position detector switch 72 and the open position detector switch 73 of the grip detector switch 71 are each constituted by a non-contacting magneto-sensitive proximity switch. However, if desired, an optical proximity switch like a photo-coupler or a contacting type detector switch like a limit switch may be employed in place of the magneto-sensitive proximity switch.

Furthermore, in the foregoing embodiments, the piston 61 of the piston-cylinder 59 is used as a target of detection by the switch 67, 72 and/or 73. However, it is also possible to provide a magnetic strip on the piston rod 62 to serve as a target of detection by these detector switches 67, 72 and 73.

Figure 9:
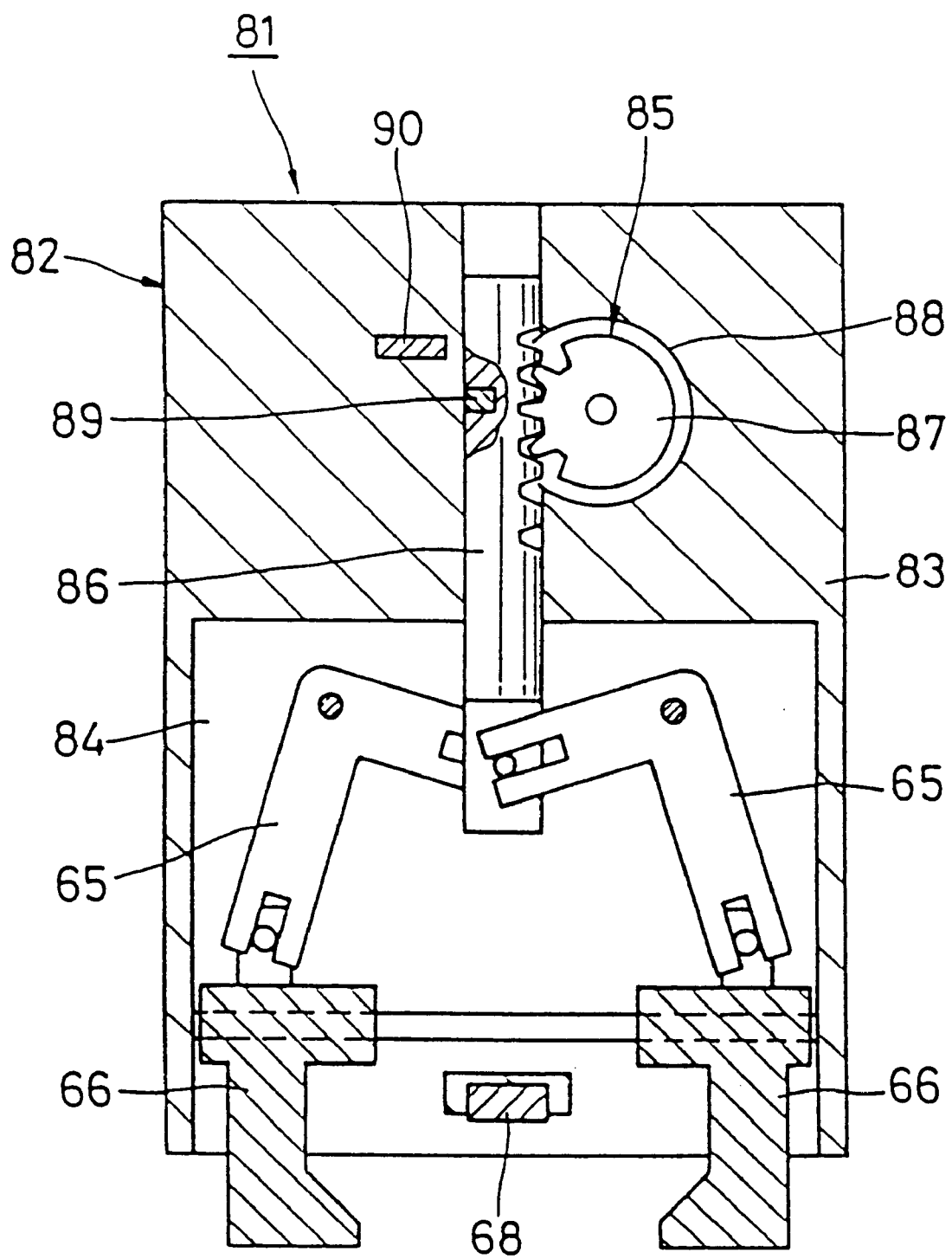
FIG. 9 is a vertical sectional view of a modification of the cartridge gripper assembly according to the invention.

On the other hand, in the foregoing embodiments, the piston-cylinder 59 is described as an example of a reciprocating actuator for the gripper 56 of the cartridge gripper assembly 55. However, the present invention is not restricted to this particular example, and, for instance, as shown in the modification of FIG. 9, there may be employed a cartridge gripper assembly 81 having a gripper 82 constituted by a gear mechanism 85 which is incorporated as a reciprocating actuator into a casing 83 similarly on the upper side of an open lower cavity 84. In this instance, the gear mechanism 85 is constituted by a rack 86 which is movable in the axial direction of the casing 83 and engaged with the link arms 65 at its lower end, a pinion 87 which is meshed with the rack 86, and a drive motor 88 such as an air motor, explosion-proof electric motor or the like for rotationally driving the pinion 87. In this case, for instance, a magnetic strip 89 can be provided on the rack 86, in combination with a grip detector switch 90 which is provided on the side of the casing 83 and arranged to detect the magnetic strip 89 when the gripper is in the gripping position.

Further, in a case where a drive motor 88 is used as a drive source as in the above-described modification, the position of the gripper can also be detected by the use of a rotational angle switch which is adapted to detect rotational position of the drive motor 88.

Figure 10:
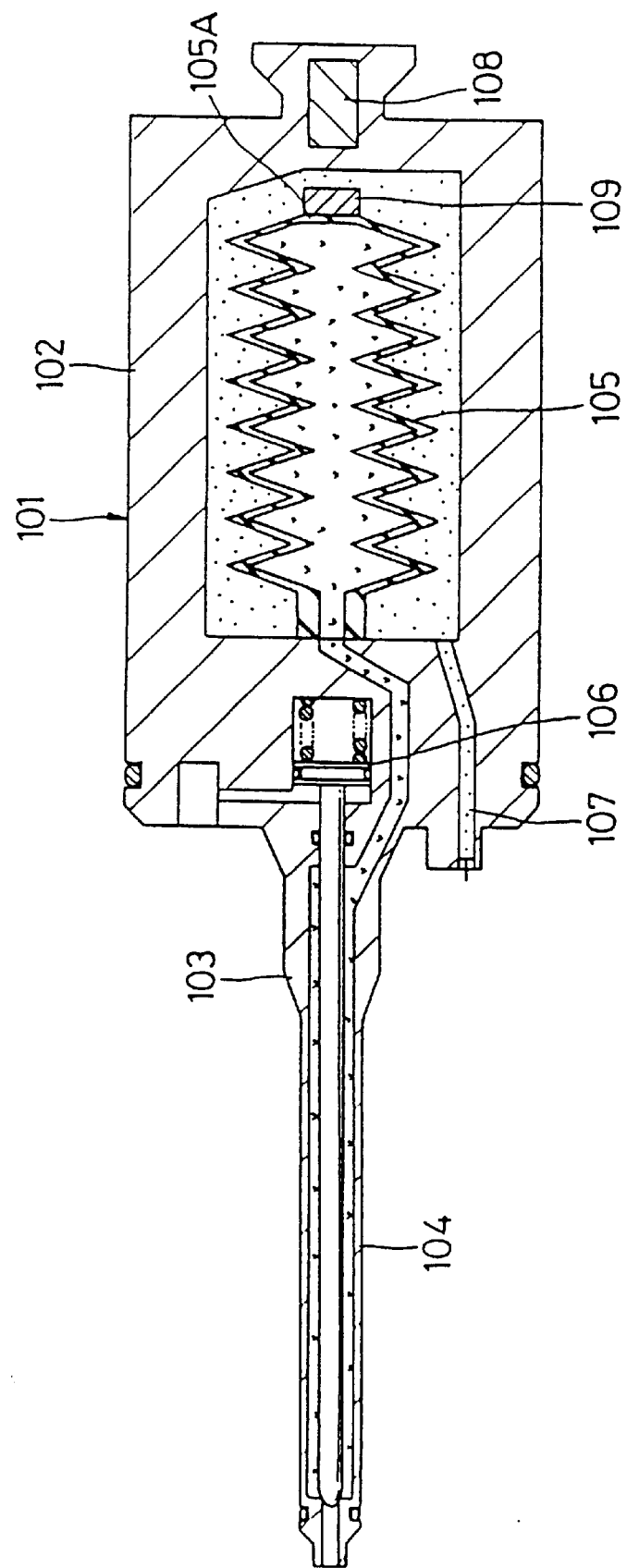
FIG. 10 is a vertical sectional view of a modification of the cartridge according to the invention.

Further, in the foregoing embodiments, the permanent magnet 38 is provided on the piston 29 which is used as a movable partition wall of the paint cartridge 25. However, in the case of a paint cartridge 101 which is constituted, as in a modification shown in FIG. 10, by a container 102, a conical projection 103, a feed tube 104, a movable partition wall in the form of bellows 105, a paint valve 106 and a thinner passage 107 on the side of the cartridge, a permanent magnet 109 may be provided on a bottom plate 105A of the bellows 105 in a confronting position relative to a core member 108 of magnetic material which is provided on the container 102.

Further, although the paint cartridge in the foregoing embodiments use thinner for pushing the piston 29, the present invention can be likewise applied to paint cartridges which may employ other extruding liquid such as water depending upon the type of paint or the type of high voltage application system.

On the other hand, in the foregoing embodiments, two or more paint cartridges 25 may be provided for each color in consideration of cartridge changing work in coating operations in which paint of same color is used continuously.

INDUSTRIAL APPLICABILITY

As described particularly hereinbefore, the cartridge gripper assembly according to the present invention comprises a gripper for gripping a paint cartridge, a grip detection means adapted to detect whether or not the paint cartridge is gripped by the gripper, and a replenishment level detection means adapted to detect whether or not the paint cartridge is replenished with paint to a predetermined level. Consequently, when a paint cartridge is gripped by the gripper of the cartridge gripper unit, the grip detection means checks out whether or not the paint cartridge is gripped securely by the gripper, thereby detecting a paint cartridge in an incomplete grip which might have resulted from malfunctioning of the gripper. Besides, the replenishment level detection means checks out whether or not the paint cartridge is replenished with paint to a predetermined extent to sort out a paint cartridge which is barely or deficiently replenished with paint. As a consequence, it becomes possible to prevent coating defects or flaws as caused by malfunctioning of the gripper or insufficient paint replenishment, for attaining higher yield and productivity.

What is claimed is:

1. An automatic coating apparatus including a working mechanism located in a coating work area, a coating apparatus mounted on said working mechanism and having a rotary atomizing head to be put in high speed rotation by an air motor for atomizing paint into minute particles, a number of paint cartridges of different colors each adapted to be replaceably and selectively mounted on said coating apparatus, and a cartridge gripper assembly adapted to grip a replenished paint cartridge to replace a used empty paint cartridge on said coating apparatus, characterized in that:

said cartridge gripper assembly comprises a gripper member adapted to grip and pick up one of said paint cartridges, a grip detection means adapted to detect whether or not said paint cartridge is securely gripped by said gripper member, and a replenishment level detection means adapted to detect whether or not said paint cartridge is replenished with paint to a predetermined degree.

2. An automatic coating apparatus as defined in claim 1, wherein said gripper member is comprised of a reciprocating actuator, and a plural number of gripper claws connected to said reciprocating actuator and thereby moved to grip or release said paint cartridge, and said grip detection means is constituted by a switch adapted to detect displacement of said reciprocating actuator.

3. An automatic coating apparatus as defined in claim 1, wherein said gripper member is comprised of a reciprocating actuator, and a plural number of gripper claws connected to said reciprocating actuator and thereby moved to grip or release said paint cartridge, and said grip detection means is constituted by a grip position detector switch adapted to detect displacement of said reciprocating actuator to a predetermined cartridge gripping position, and a release position detector switch adapted to detect displacement of said reciprocating actuator to a predetermined gripper claw opening position.

4. An automatic coating apparatus as defined in claim 1, wherein said paint cartridge is comprised of a container, a feed tube extended out from a fore end of said container, and a movable partition wall provided internally of said container to divide same into a paint reservoir chamber in communication with said feed tube and an extruding liquid chamber connected to a paint extruding liquid supply, said replenishment level detection means is constituted by a detector switch adapted to detect displacement of said movable partition wall when said container is replenished with paint.

5. An automatic coating apparatus as defined in claim 1, wherein said paint cartridge is comprised of a container formed of a non-magnetic material and closed on the side of a base end thereof, a feed tube extended out from a fore end of said container, a movable partition wall provided internally of said container to divide same into a paint reservoir chamber in communication with said feed tube and an extruding liquid chamber connected to a paint extruding liquid supply, a core member of a magnetic material provided at said base end of said container, and a permanent magnet provided on said movable partition wall in a confronting position relative to said core member, and said replenishment level detector means is constituted by a magneto-sensitive switch adapted to detect said permanent magnet when moved to the proximity of said core member.

6. An automatic coating apparatus as defined in claim 5, wherein said movable partition wall is a piston slidably fitted in said container for axial sliding movements therein.

7. An automatic coating apparatus as defined in claim 4, wherein said movable partition wall is a bellows tube which is contractibly expansible in said container.

* * * * *

UNITED STATES PATENT AND TRADEMARK OFFICE
CERTIFICATE OF CORRECTION

PATENT NO.    : 6,338,441 B1
DATED         : January 15, 2002
INVENTOR(S)   : Norio Umezawa et al.

It is certified that error appears in the above-identified patent and that said Letters Patent is hereby corrected as shown below:

<u>Title page</u>,
Item [56], References Cited, U.S. PATENT DOCUMENTS, please add the following references:
-- 08229446      09/10/96      Murage Masashi, et al. --

Signed and Sealed this

Twentieth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,338,441 B1
DATED : January 15, 2002
INVENTOR(S) : Umezawa et al.

It is certified that error appears in the above-identified patent and that said Letters Patent is hereby corrected as shown below:

Title page,
Item [*] Notice, delete the phrase "by 19 days" and insert -- by 0 days --
Item [56], References Cited, U.S. PATENT DOCUMENTS, please add the following reference:
-- 08229446    09/10/96    Murate Masashi, et al. --

Signed and Sealed this

Eleventh Day of May, 2004

JON W. DUDAS
*Acting Director of the United States Patent and Trademark Office*